(12) United States Patent
McKenna et al.

(10) Patent No.: US 9,880,304 B2
(45) Date of Patent: Jan. 30, 2018

(54) METHOD FOR DETERMINING FRACTURE PROPPANT SPATIAL DISTRIBUTION USING PASSIVE SEISMIC SIGNALS

(71) Applicant: Microseismic, Inc., Houston, TX (US)

(72) Inventors: Jonathan P. McKenna, Golden, CO (US); Nathan M. Toohey, Golden, CO (US)

(73) Assignee: MICROSEISMIC, INC., Houston, TX (US)

( * ) Notice: Subject to any disclaimer, the term of this patent is extended or adjusted under 35 U.S.C. 154(b) by 42 days.

(21) Appl. No.: 14/903,326

(22) PCT Filed: May 27, 2015

(86) PCT No.: PCT/US2015/032652
§ 371 (c)(1),
(2) Date: Jan. 7, 2016

(87) PCT Pub. No.: WO2016/190863
PCT Pub. Date: Dec. 1, 2016

(65) Prior Publication Data
US 2017/0097431 A1    Apr. 6, 2017

(51) Int. Cl.
*G01V 1/30* (2006.01)
*G01V 1/50* (2006.01)
(Continued)

(52) U.S. Cl.
CPC ............. *G01V 1/301* (2013.01); *E21B 47/00* (2013.01); *G01V 1/288* (2013.01); *G01V 1/50* (2013.01);
(Continued)

(58) Field of Classification Search
None
See application file for complete search history.

(56) References Cited

U.S. PATENT DOCUMENTS 9,158,021 B2 * 10/2015 McKenna ................ G01V 1/42
2011/0044131 A1 * 2/2011 Thornton ............... G01V 1/288
367/38
(Continued)

FOREIGN PATENT DOCUMENTS

WO    2014009866 A2    1/2014

OTHER PUBLICATIONS

The International Search Report and the Written Opinion of the International Searching Authority, PCT/US2015/032652, dated Aug. 26, 2015.

*Primary Examiner* — Joseph Schoenholtz
(74) *Attorney, Agent, or Firm* — Richard A. Fagin

(57) ABSTRACT

A method for determining spatial distribution of proppant incudes using signals detected by seismic sensors disposed proximate a formation treated by pumping fracturing fluid containing the proppant. Origin time and spatial position of seismic events induced by pumping the fracturing fluid are determined. Volume and orientation of at least one fracture in the subsurface formation associated with each induced seismic event are determined. Spatial distribution of a volume of the pumped fracturing fluid is determined using the volume and orientation of each fracture. A length of ellipsoidal axes is selected using a surface defined by a selected fractional amount of the total volume of frac fluid pumped into the formation. Spatial distribution of the proppant is determined using proppant mass, specific gravity and expected proppant porosity in the fractures, and spatially distributing a volume of the fractures within an ellipsoid defined by the ellipsoidal axes.

13 Claims, 13 Drawing Sheets

(51) Int. Cl.
*G01V 1/28* (2006.01)
*E21B 47/00* (2012.01)

(52) U.S. Cl.
CPC ................ *G01V 2210/1234* (2013.01); *G01V 2210/1299* (2013.01); *G01V 2210/646* (2013.01); *G01V 2210/65* (2013.01)

(56) References Cited

U.S. PATENT DOCUMENTS

| | | | |
|---|---|---|---|
| 2011/0317518 A1* | 12/2011 | Guigne | G01V 1/48 367/35 |
| 2014/0202688 A1 | 7/2014 | McKenna et al. | |
| 2014/0216729 A1 | 8/2014 | McKenna et al. | |
| 2015/0083403 A1 | 3/2015 | Witt et al. | |
| 2015/0268365 A1* | 9/2015 | Djikpesse | G01V 1/42 702/14 |
| 2016/0010443 A1* | 1/2016 | Xu | E21B 43/26 166/250.1 |
| 2017/0261643 A1* | 9/2017 | Thompson | G01V 11/007 |

* cited by examiner $$A * \Delta u = \frac{1}{K} \text{ Times Bigger}$$

$$l^2 * l^{0.5} = \frac{1}{K} \text{ Times Bigger}$$

$$l^{\frac{5}{2}} = \frac{1}{K} \text{ Times Bigger}$$

$$C_l = \left(\frac{1}{K}\right)^{\frac{2}{5}} \quad \text{Length Scaling Factor}$$

$$C_A = \left(\frac{1}{K}\right)^{\frac{4}{5}} \quad \text{Area Scaling Factor}$$

$$C_{disp} = \frac{1}{C_A} = (K)^{\frac{4}{5}} \quad \text{Displacement Scaling Factor}$$

NOTE: The scaling factor can be applied to the displacement only, and all the rest of the parameters will follow, as per the previous calculation flow.

FIG. 6 a = Vertical b = Perpendicular to event Trend c = Parallel to event trend

US 9,880,304 B2

METHOD FOR DETERMINING FRACTURE PROPPANT SPATIAL DISTRIBUTION USING PASSIVE SEISMIC SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of mapping induced fractures in subsurface formations, more specifically, the disclosure relates to method for identifying orientation of fractures induced, for example, by hydraulic fracturing using passive seismic signals detected above the formation in which the fractures are induced.

Passive seismic-emission tomography is a technique that is used for, among other purposes, determining the hypocenter (i.e., place and time of origin) of microearthquakes such as formation fracturing that occurs in subsurface rock formations. Such microeathquakes may be naturally occurring or may be induced, for example, by pumping fluid into formations at sufficient pressure to cause failure, i.e., fracturing of the formation. In the latter case, it is useful to be able to determine progression of the fluid front as the fluid is pumped into the formations. One technique for performing such fluid front determination during fracture pumping is described in U.S. Pat. No. 7,663,970 issued to Duncan et al. incorporated herein by reference in its entirety. The technique described in the Duncan et al. '970 patent may be used to determine hypocenters of microseismic events (or microearthquakes) caused by failure of the subsurface rock formations as hydraulic fracturing fluid is pumped into the formations.

U.S. Pat. No. 8,960,280 issued to McKenna et al. describes a method for determining orientation of induced fracture planes using determined hypocenters occurring within certain spatial and temporal limits of each other. U.S. Patent Application Publication No. 2014/0216729 filed by McKenna describes a method for determining volume of a fracture network created by pumping fracture fluid using passive seismic signals.

BRIEF DESCRIPTION OF THE DRAWINGS

FIG. 6 shows a basis for using a scaling factor with a fracture displacement raised to a 4/5 power.

DETAILED DESCRIPTION

Figure 1:
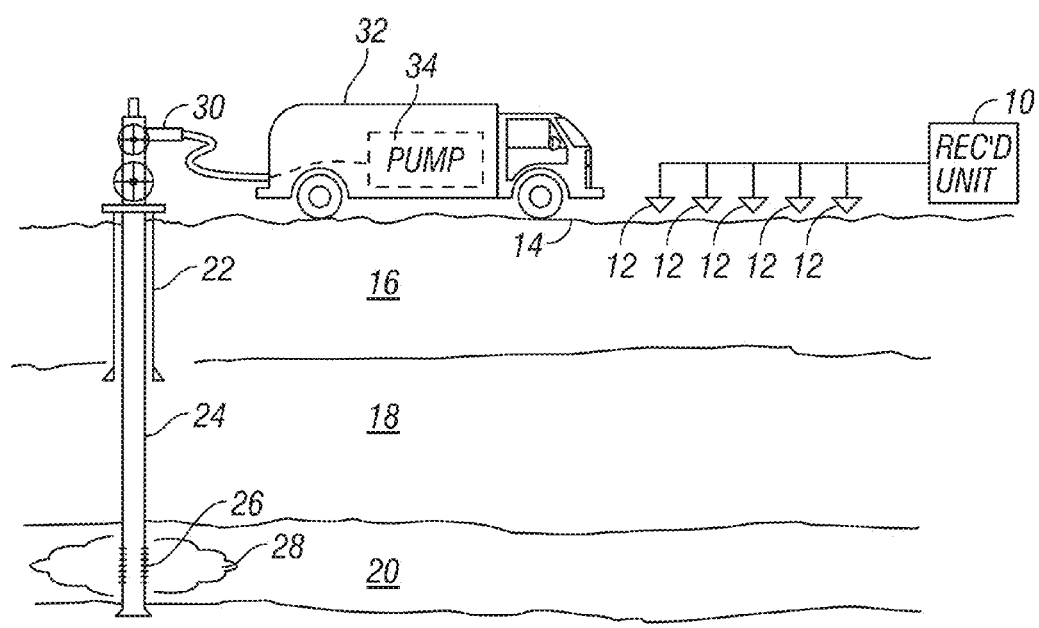
FIG. 1 shows an arrangement of seismic sensors used in a passive seismic method according to one embodiment of the invention associated with frac monitoring.

FIG. 1 shows a typical arrangement of seismic sensors as they would be used in one application of a method according to the present disclosure. The embodiment illustrated in FIG. 1 is associated with an application for passive seismic emission tomography known as "frac monitoring."

In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." The seismic sensors 12 in the present embodiment may be geophones, but may also be accelerometers or any other sensing device known in the art that is responsive to velocity, acceleration or motion of the particles of the Earth proximate the sensor. The seismic sensors may be single component (i.e., having only one direction of sensitivity) or may be multi-component (i.e., having two or more sensitive directions). The seismic sensors 12 may generate electrical or optical signals in response to the particle motion or acceleration, and such signals are ultimately coupled to a recording unit 10 for making a time-indexed recording of the signals from each sensor 12 for later interpretation by a method according to the present disclosure. In other implementations, the seismic sensors 12 may be disposed at various positions within a wellbore drilled through the subsurface formations. A particular advantage of the method of the described herein is that it provides generally useful results when the seismic sensors are disposed at or near the Earth's surface. Surface deployment of seismic sensors is relatively cost and time effective as contrasted with subsurface sensor emplacements typically needed in methods known in the art prior to the present invention.

In some embodiments, the seismic sensors 12 may be arranged in sub-groups having spacing there between less than about one-half the expected wavelength of seismic energy from the Earth's subsurface that is intended to be detected. Signals from all the sensors in one or more of the subgroups may be added or summed to reduce the effects of noise in the detected signals.

In other embodiments, the seismic sensors 12 may be placed in a wellbore, either permanently for certain long-term monitoring applications, or temporarily, such as by wireline conveyance, tubing conveyance or any other sensor conveyance technique known in the art.

A wellbore 22 is shown drilled through various subsurface Earth formations 16, 18, through a hydrocarbon producing formation 20. A wellbore tubing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a frac pumping unit 32. The frac pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12. One example technique for determining the place (position in space in the subsurface) and time of origin ("hypocenter") of each microseismic event is described in U.S. Pat. No. 7,663,970 issued to Duncan et al. and incorporated by reference as if fully set forth herein.

While the wellbore shown in FIG. 1 extends essentially vertically through the formations, it will be appreciated by those skilled in the art that the geodetic trajectory of the wellbore in other examples may be deviated from vertical, or may be drilled initially vertically and then have the trajectory changed so that the wellbore follows a selected path through the formations. Examples of such trajectory may include following the geologic layering attitude of the formations, e.g., horizontal or nearly horizontal, so that the wellbore extends for a substantial lateral distance through one or more selected formations.

Having explained one type of passive seismic data that may be used with methods according to the invention, a method for processing such seismic data will now be explained. The seismic signals recorded from each of the sensors 12 may be processed first by certain procedures well known in the art of seismic data processing, including the summing described above, and various forms of filtering. In some embodiments, the sensors 12 may be arranged in directions substantially along a direction of propagation of acoustic energy that may be generated by the pumping unit 32, in the embodiment of FIG. 1 radially outward away from the wellhead 30. By such arrangement of the seismic sensors 12, noise from the pumping unit 32 and similar sources near the wellhead 30 may be attenuated in the seismic signals by frequency-wavenumber (f k) filtering. Other processing techniques for noise reduction and/or signal enhancement will occur to those of ordinary skill in the art.

Figure 2:
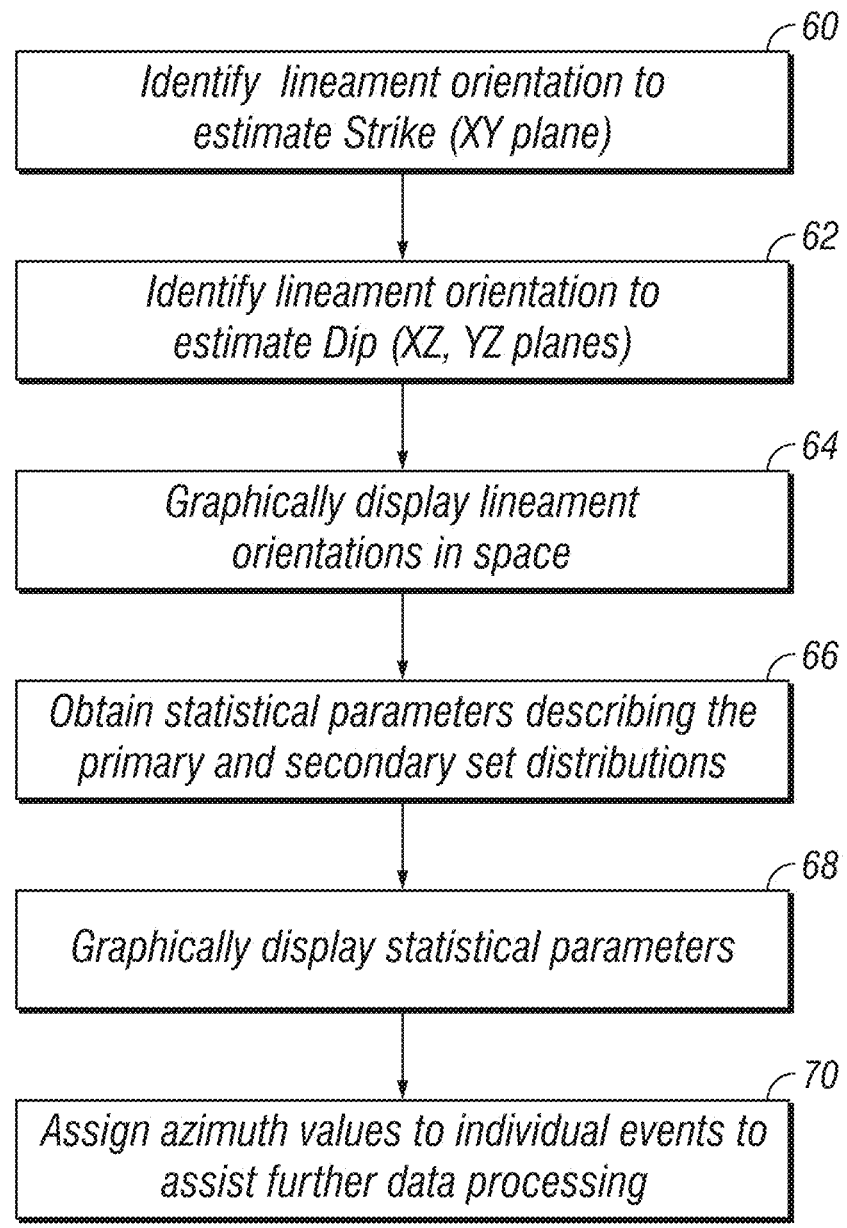
FIG. 2 shows a flow chart of an example implementation of a fracture plane orientation determination procedure.

A flow chart of an example process for determining fracture plane orientation is shown in FIG. 2. At 60, linear features ("lineaments") which may correspond to formation fracture planes may be identified from the event hypocenters determined as explained above. At 60, the "strike" (geologic direction of the fracture plane projected into the horizontal plane may be determined. At 62, the "dip" or angle of the identified fracture planes may be determined from the determined hypocenters.

At 64, in some examples, a visual display such as on a computer or computer system, described further below, may be generated for purposes of visual analysis of the identified fracture planes in three dimensional space. At 66, strikes and dips of a plurality of identified fracture planes may be statistically analyzed, e.g., by numbers of occurrences of each value of strike and dip identified as explained above. At 68, the statistical analysis may be used to generate a visual display. Using the visual display or predetermined selection criteria, the statistically analyzed lineament information may be used for further analysis.

Figure 3:
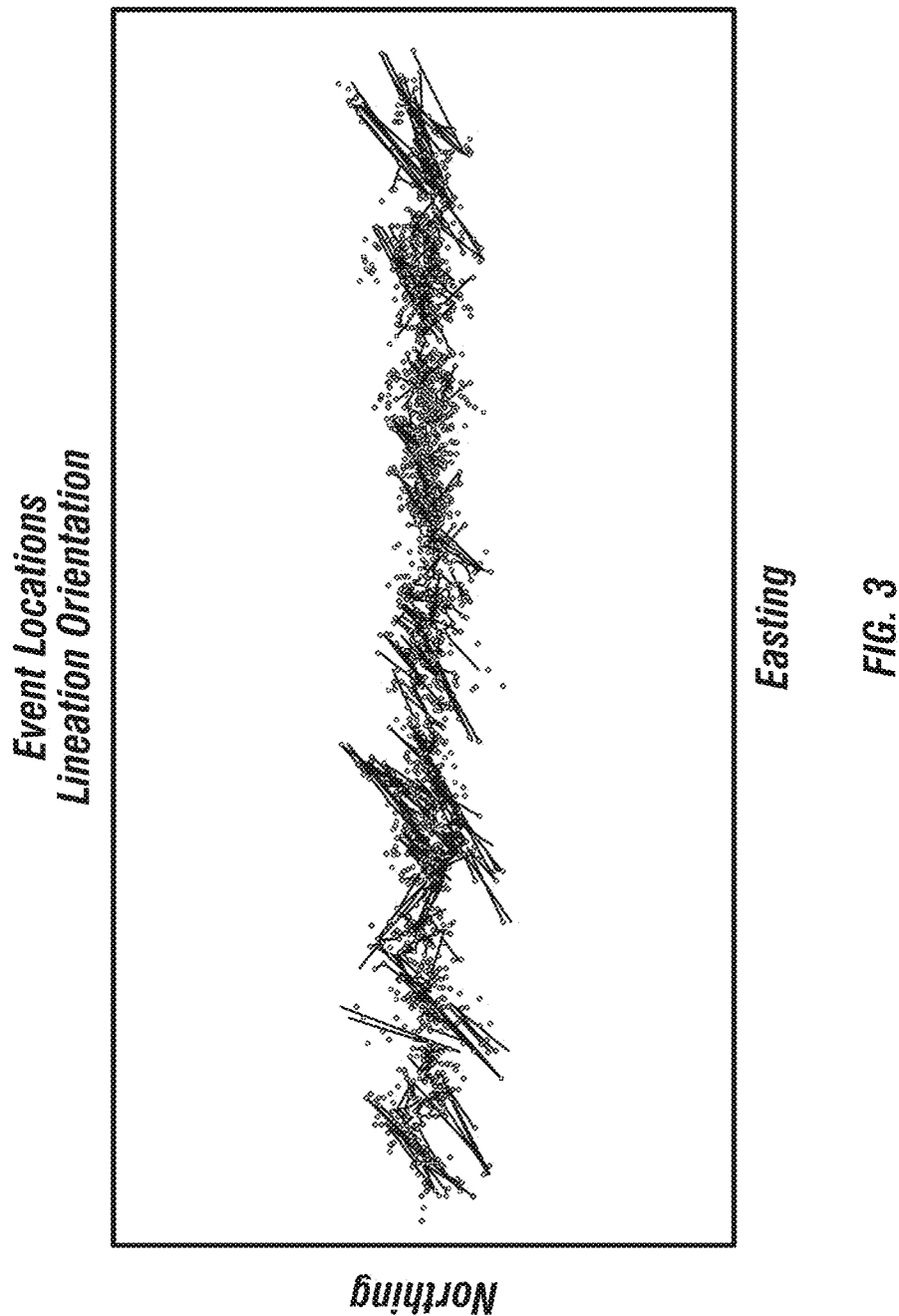
FIG. 3 shows graphically an example of lineament analysis in map view.

Referring to FIG. 3, an example of lineament analysis is shown graphically in map view. Individual hypocenters are represented in the figure as dots indicating the spatial position of each determined hypocenter. In the example shown in FIG. 3, the portion of a wellbore for which the lineaments are determined is substantially along the bedding plane of one of the formations such as shown in FIG. 1. The lines passing through clusters of identified hypocenters represent lineaments identified as will be explained below.

An example of calculation of lineaments using the determined hypocenters may include selecting a predetermined number of consecutive hypocenters to filter the determined hypocenters with reference to a time of origin, e.g., at the beginning of fracture fluid pumping in each of a plurality of stages. For example, a temporal sampling window of a selected number, in the present example four, hypocenters occurring sequentially in time may be used to assist in identification of microseismic event hypocenters that are likely to have resulted from the same microearthquake or microseismic event (e.g., an induced fracture). In other examples, selected length time windows may be used, for example, several minutes to several hours in duration depending on progress of the fracture treatment and the quality of the received signals. Within the selected temporal sampling window, the spatial position of each hypocenter (determined, e.g., as explained above) may be processed by linear regression analysis using a predetermined minimum regression coefficient ($R^2$), which may be, for example, 0.8, although other values may be used depending on the quality of the data obtained and the apparent degree to which hypocenters appear to correspond to linear features in the subsurface. A best-fit line through the selected hypocenters in each window which fall within the regression coefficient may be identified as a fracture plane. As explained above, the strike and dip of the fracture plane may be determined by the three-dimensional orientation of the best-fit line. Hypocenters which do not result in a best-fit line having the minimum regression coefficient may be excluded from the analysis, and the window may be moved to at least one consecutive event (or moved in time by a selected value). The foregoing procedure may be repeated for all the hypocenters, or selected subsets thereof, determined for the entire hydraulic fracturing procedure, e.g., explained with reference to FIG. 1.

In the present example embodiment, the hydraulic fracture treatment procedure may take place in a plurality of sequentially performed "stages", wherein each stage is associated with a specific longitudinal point of fluid entry or longitudinal interval of entry within the wellbore. In some multiple stage fracture treatment methods, the individual stage positions may be isolated by perforating the wellbore casing at a selected longitudinal position, pumping the fracture fluid and subsequently placing a flow barrier or plug in the wellbore above the perforations. The perforating and pumping of a fracture treatment may then be repeated for a subsequent stage at a longitudinal position "above" (closer to the wellhead) the plug. The foregoing may be repeated for any selected number of stages. In other embodiments, controllable fluid entry barriers, for example, sliding sleeve valves, may be used to enable pumping of a fracture treatment into one or more selected zones and subsequent closure of such zones. Subsequent pumping of fracture treatments into one or more different longitudinally spaced apart zones may be performed as in the prior described embodiment using plugging and perforating in longitudinally successively shallower zones.

After all the hypocenters for each fracture treatment stage are determined, a plot such as shown in FIG. 3 may be generated for visual analysis of the determined fracture planes. The true dip of the fracture plane may be determined, for example using the following expressions:

$$\tan\delta = \frac{\tan\alpha}{\sin\beta}$$

$$\delta = \tan^{-1}\frac{\tan\alpha}{\sin(s-s_{xs})}$$

Figure 4:
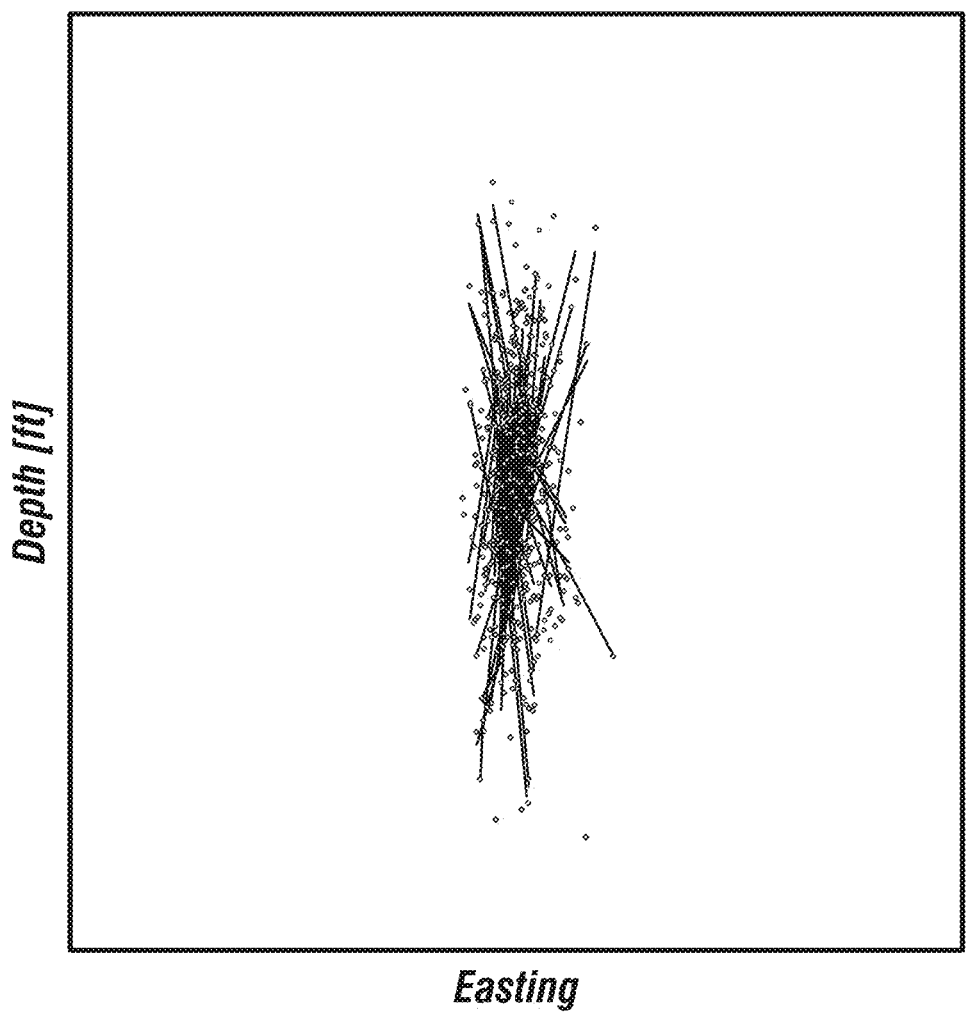
FIG. 4 shows a vertical section view of example lineament analysis as shown in FIG. 3.

$\delta$ in the above expressions is the true fracture plane dip, $\alpha$ is an apparent dip, $\beta$ is $S-S_{xs}$, $S$ is true strike and $S_{xs}$ is the cross-sectional azimuth (90° for the XZ plane and 0° for YZ plane). FIG. 3 shows a vertical section view of the hypocenters and the determined fracture planes. FIG. 4 shows an example vertical section view of hypocenters and best fit lines therethrough using the above described lineament calculation method to determine a geodetic orientation (azimuth) of each determined fracture plane.

Figure 5:
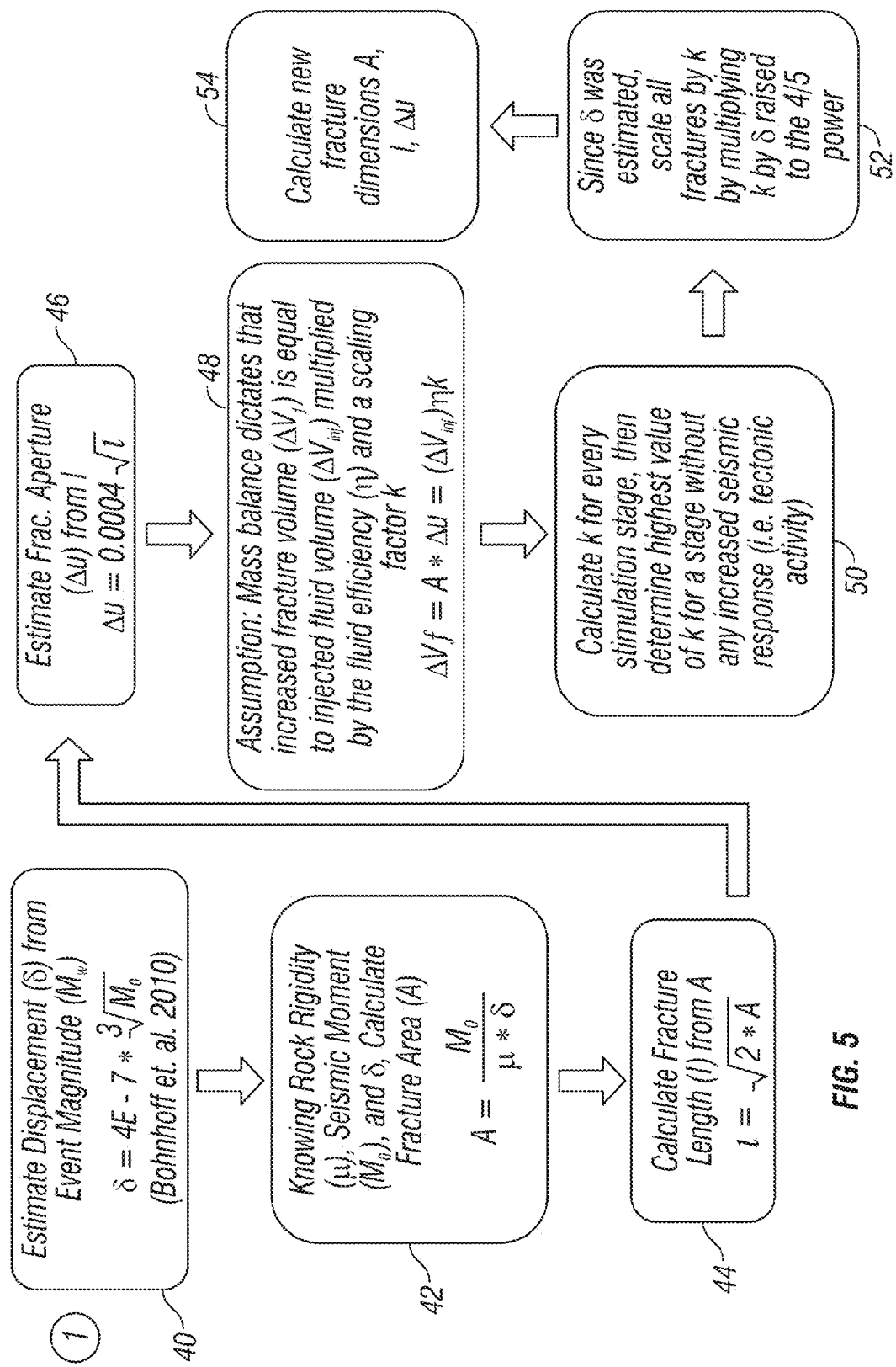
FIG. 5 shows a flow chart of an example implementation of a procedure for determining fracture network volume.

A flow chart of an example process than may be used for determining fracture network volume for each fracture stage is shown in FIG. 5. The example process is based on the principle of material balance, that is, the volume of fracturing fluid (multiplied by an empirical efficiency factor) pumped in any individual pumping operation should be equal to the volume of all the fractures in a fracture network created by pumping the fluid into the formations. First, a fracture network resulting from pumping the fracturing fluid may be calculated by applying the formula in 42 in FIG. 5 to each hypocenter location. A network may be determined for each pumped fracture stage (explained below). At 40 in FIG. 5, an apparent fracture displacement ($\delta$) for the identified fractures in the network may be determined from the seismic moment (Mo). The seismic moment (Mo) may be determined from the detected seismic signal amplitudes associated with each hypocenter determined as explained above. A non-limiting method to determine the seismic moment is described in, Bornhoff M., Dresen G., Ellsworth W. L., and Ito H., 2009, *Passive Seismic Monitoring of Natural and Induced Earthquakes: Case Studies, Future Directions and Socio-Economic Relevance,* in Clotingh, S. and Negendank, J. (Eds.), New Frontiers in Integrated Solid Earth Sciences, Spring, N.Y., pp. 261-285. The fracture displacement $\delta$ may be determined from the seismic moment Mo by the expression:

$$\delta = 4E - 7\sqrt[3]{Mo} \quad (1)$$

as explained in the above cited Bornhoff et al. reference.

At 42, the rock rigidity $\mu$ may be determined from one of several sources. One source may be well log measurements from a well drilled through formation that is actually fractured treated, or from a nearby wellbore. Well log measurements for such purpose may include acoustic compressional and shear velocities, and formation density. Instruments and methods for obtaining the foregoing parameters for a particular formation are well known in the art. Rock rigidity ($\mu$) is a Lamé parameter and may be calculated by the expression:

$$\mu = V_s^2 \rho$$

where Vs is the shear wave velocity in meters per second and $\rho$ is density in kg/m³; $\mu$ has units of Pa. By obtaining the rock rigidity, also at 42, and using the displacement determined at 40, the fracture area A associated with each hypocenter may be determined using, for example, the expression:

$$A = \frac{Mo}{\mu \times \delta} \quad (2)$$

A fracture length L may be estimated, as shown at 44, using an empirically determined aspect ratio for induced fractures, namely that the fracture length is generally twice the width of the fracture:

$$L = \sqrt{2A} \quad (3)$$

A fracture aperture $\Delta\mu$ may be determined, at 46, using an empirically derived expression:

$$\Delta\mu = CL^e \quad (4)$$

Such empirically derived expression is described in, Olson, J. E., 2003, *Sublinear scaling of fracture aperture versus length: an exception or the rule?,* Journal of Geophysical Research 108 (2413). doi:10.1029/2001JB000419. Empirically derived values for C may be 0.0008 and for e may be 0.5 when aperture units are in meters.

In the present example, as shown at 48 in FIG. 5, an assumption is made that the volume of induced fractures $\Delta V_f$ is related to the amount of fluid pumped in the fracturing operation as described with reference to FIG. 1.

$$\Delta V_f = A^* \Delta\mu = (\Delta V_{inj})\eta k \quad (5)$$

in which $\eta$ is a fluid efficiency factor that accounts for portions of the pumped fracture fluid which may leak or permeate into the formation without contributing to the fracture volume. The fluid efficiency factor may be empirically determined for various types of fracture fluids and for various formations and ambient conditions such as pumped fluid pressure. In Eq. (5), k represents a scaling factor. The scaling factor is a value determined for a particular formation and fracture treatment type that accounts for the fact that not all fractures are necessarily determinable by detecting and recording seismic signals above the volume of the subsurface being examined. It is believed for purposes of the present disclosure that k is substantially the same for all stages in a multiple stage fracture treatment within a particular formation, e.g., as along several locations within a wellbore following the bedding plane of a certain subsurface formation. A graph of seismic event magnitude with respect to frequency of occurrence (described in the McKenna publication set forth above) shows an exponential distribution trend which appears to peak at a magnitude related to the threshold seismic signal detection level. There may be large numbers of very small magnitude fractures that are not accounted for in the volume analysis at 40, 42 and 44 in FIG. 5 because events having magnitude below a certain noise threshold may not be detected and are thus missing from the total fracture volume calculated as explained above.

At 50 a value of k may be determined for each fracture treatment stage pumped. In some examples, a wellbore may be drilled substantially vertically at first, and then directionally drilled so as to substantially follow the bedding plane of a selected formation. Such wellbores may be fracture treated at different intervals along the length of the wellbore, wherein each such treatment interval may be known, as explained above, as a "stage." A value of k may be determined for each such stage. At 50 the highest value of k may be determined from the k value determined from each of the stages wherein there is no associated tectonic activity or feature. A method for identifying tectonic features using microseismicity is discussed in Wessels, S. A., A. De La Pena, M. Kratz, S. Williams-Stroud, T. Jbeili, 2011, *Identifying faults and fractures in unconventional reservoirs through microseismic monitoring*, First Break, 29, pp. 99-104. Hypocenters related to a natural tectonic feature such as a fault may contribute to very large magnitudes of detected subsurface seismic events. The existence of natural tectonic features may be inferred initially from surveys such as surface reflection seismic and may be verified by examining the distribution of hypocenters for the existence of hypocenters that do not track the wellbore. Hypocenters from natural tectonic features may be removed from the set of data used for further analysis.

Referring once again to FIG. 5, at 52, the highest value of k selected as explained above may be applied to the displacements of each fracture in each and every stage of the fracture treatment, wherein the displacement for each fracture is raised to the 4/5 power. The explanation for raising the displacement value to the 4/5 power is shown in FIG. 6. Once new displacements for all fractures are calculated, at 54 in FIG. 5, new fracture dimensions are calculated for each fracture as shown at 42 in FIG. 5. After the new fracture dimensions are calculated, the total calculated fracture volume may be expected to match the pumped fracture fluid volume times the fluid efficiency, that is, as if k in Eq. (4) were equal to unity.

In some embodiments, the fracture plane orientations determined as explained above may be averaged to obtain an average azimuth of the fracture networks created by each stage of the fracture treatment. Averaging may be performed, for example, by translating the coordinates of each determined line to a commonly referenced coordinate system. Such commonly referenced coordinate system may be, for example, a centrally located position along the longitudinal dimension of the wellbore, or a center point of any one of the fracture stages. In some embodiments, the location of the coordinate reference point may include any fluid injection point. In typical wellbore completions, there are usually multiple fracturing fluid entry points within each fracturing stage. A common example of the foregoing is a "plug and perforate" multi-stage fracture system where each stage is bounded by plugs in the wellbore to seal the stage axially from the remainder of the wellbore and between the plugs. Multiple perforations in a wellbore liner or casing are created, e.g., using a shaped charge perforating gun. Such perforating creates discrete entry points within the wellbore liner or casing where the fracturing fluid exits the wellbore. It may be the case that there is uncertainty as to exactly which of the perforations in any stage communicate the fracturing fluid to the formation; sometimes only a small fraction of the perforations in any stage are actually active. Because the positions of each of the perforations is determinable, it is possible to use such locations to use the shape of the modeled ellipsoid to estimate which perforations are active; the active perforation locations may be used for estimating spatial distribution of the proppant as will be further explained below.

Once the average azimuth is determined, and the fractures are translated in position to a commonly referenced coordinate system, the volumes of each of the fractures may be summed and plotted in three orthogonal dimensions with reference to the origin of the commonly referenced coordinate system. The volumes of the fractures as plotted may be calibrated with reference to the fraction of the total volume of fracture fluid pumped, by individual fracture stage and them by total volume pumped for all stages. The fluid volume pumped into the fractures may be corrected for any leaked fluid volume, for example, as described in the McKenna publication set forth above.

Figure 7:
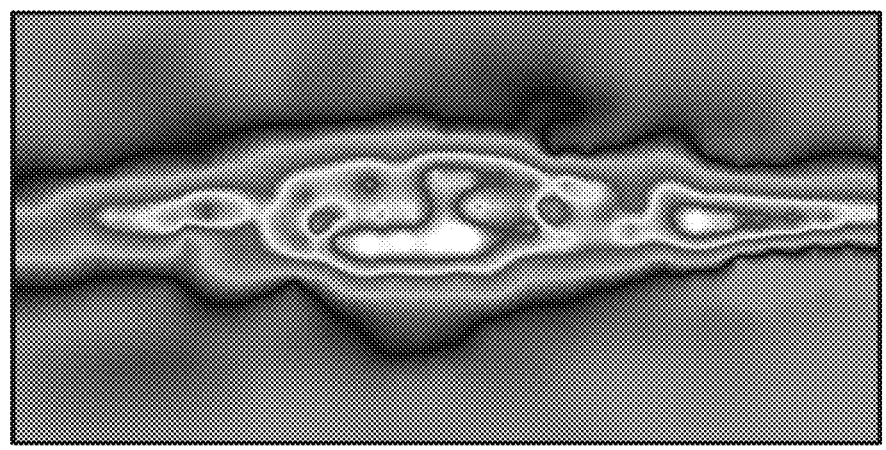
FIG. 7 shows a two-dimensional view of a cumulative, 3D pumped fluid volume plot.

One axis of the three orthogonal dimension plot may correspond to the average azimuth determined as explained above. The two remaining coordinate axes may be orthogonal to the average azimuth axis, wherein one of the remaining coordinate axes is vertical. FIG. 7 shows a two-dimensional view of a cumulative, 3D pumped fluid volume plot generated as explained above.

Figure 8:
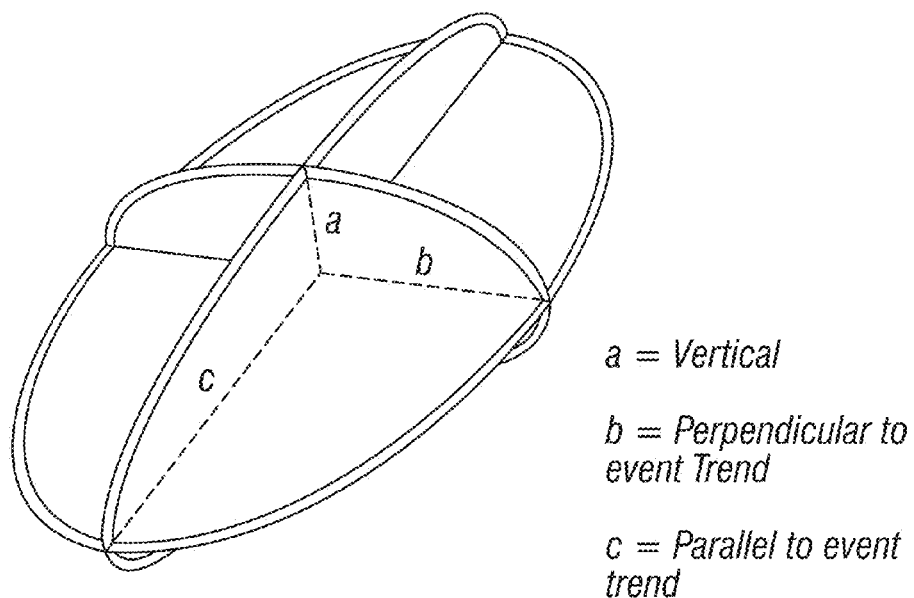
FIG. 8 shows that the plot of FIG. 7 in three dimensions may be represented as an ellipsoid having a major axis c parallel to the average azimuth.
Figure 9:
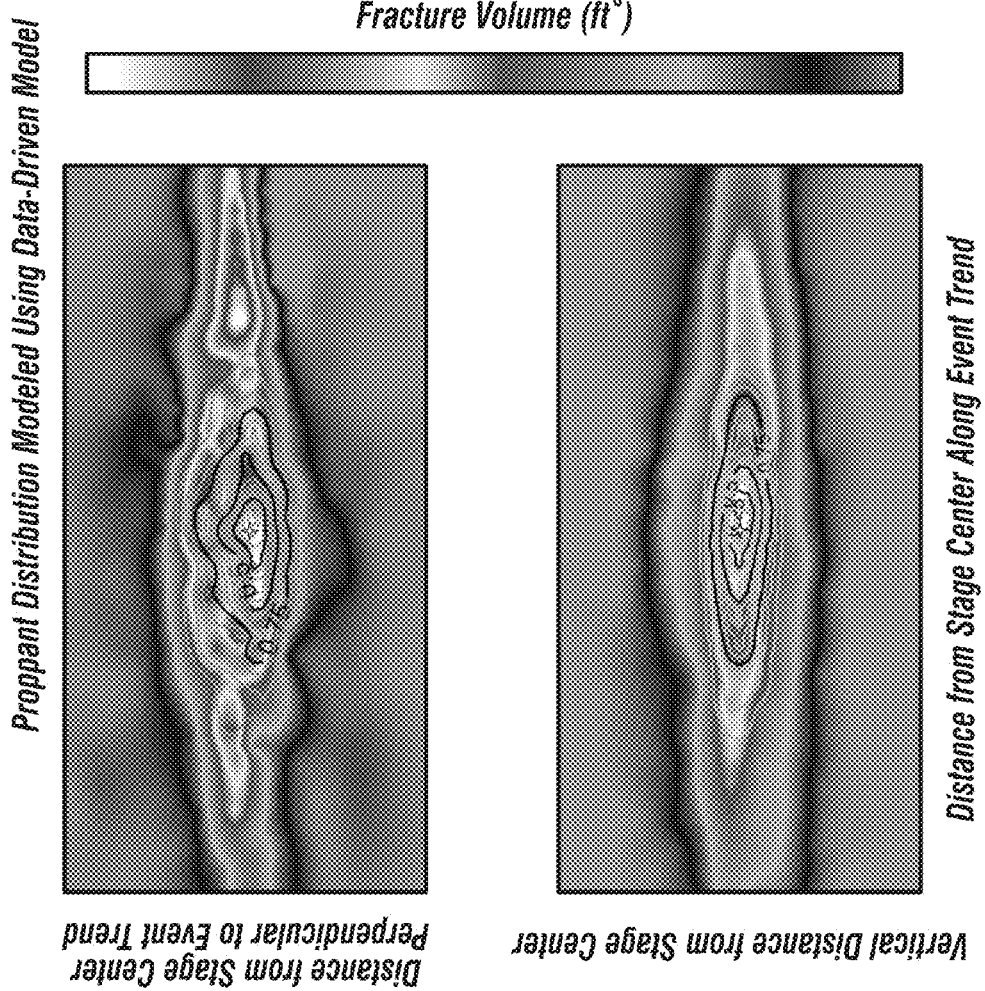
FIG. 9 shows example plots of cumulative pumped fluid volume distribution plotted (in two dimensions).

FIG. 8 shows that the plot of FIG. 7 in three dimensions may be represented as an ellipsoid having a major axis c parallel to the average azimuth. A minor axis b is perpendicular to the major axis. The vertical axis is shown at a. The lengths of the respective ellipsoidal axes, a, b and c may be determined using a selected threshold value of the cumulative pumped fracture fluid volume. Such threshold value may approximate ellipsoidal shapes in three dimensions and the axial dimensions of the shape of the selected threshold value may be used as the dimensions of the lengths of the three axes of the ellipsoid. FIG. 9 shows example plots of cumulative pumped fluid volume distribution plotted as contours in two dimensions, as explained above for two different wellbores for which multiple facture stages were pumped and the passive seismic data were processed as explained with reference to FIGS. 2 through 6. Contours of equal fractions of the total volume of fluid pumped are provided for illustration of the principle of using such pumped fluid volume plots. In three dimensions, equal fractions of the total pumped fluid volume will define respective surfaces which may be approximated by an ellipsoid having axes determined as explained above.

Figure 10:
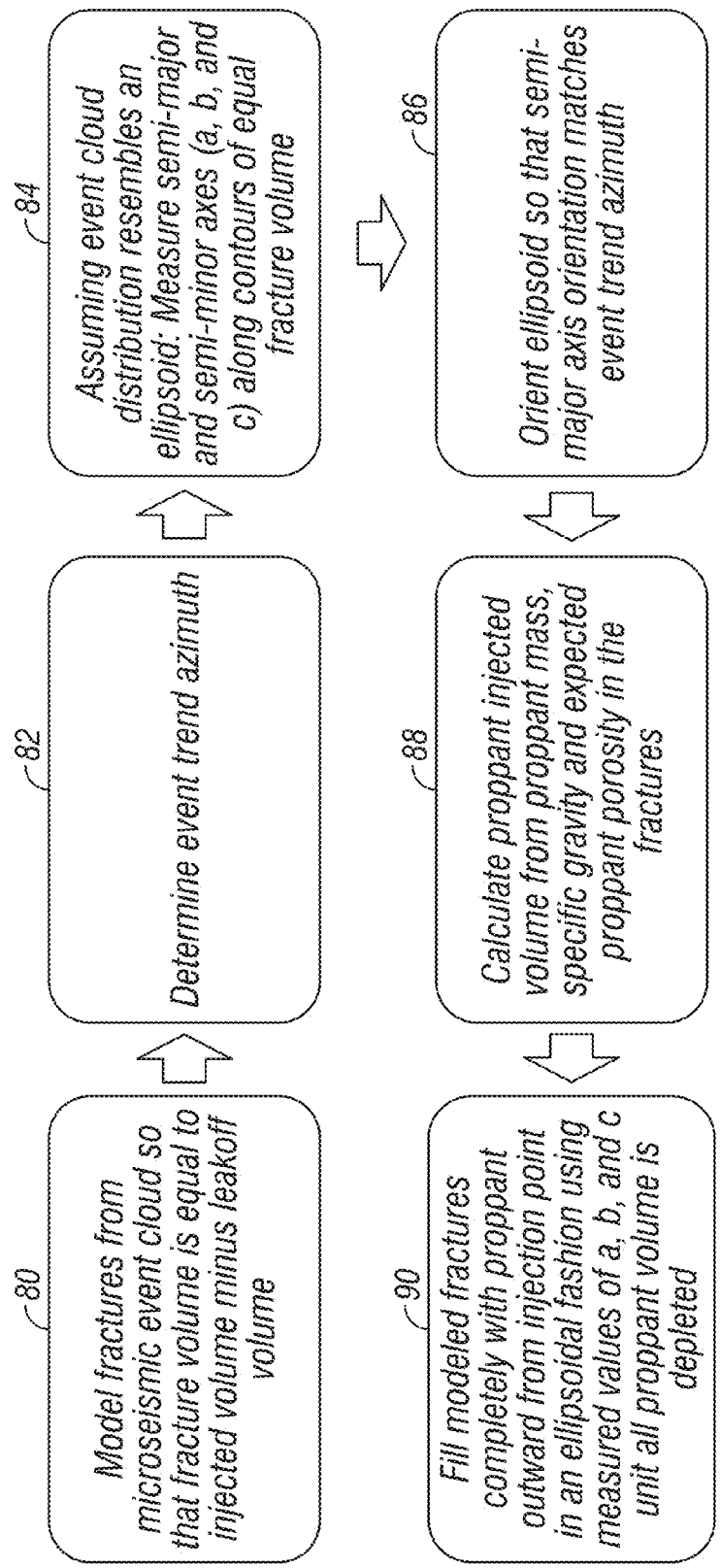
FIG. 10 shows a flow chart of a method for using the ellipsoidal representation of the pumped fluid volume to determine spatial distribution of the pumped fracture proppant.
Figure 11:
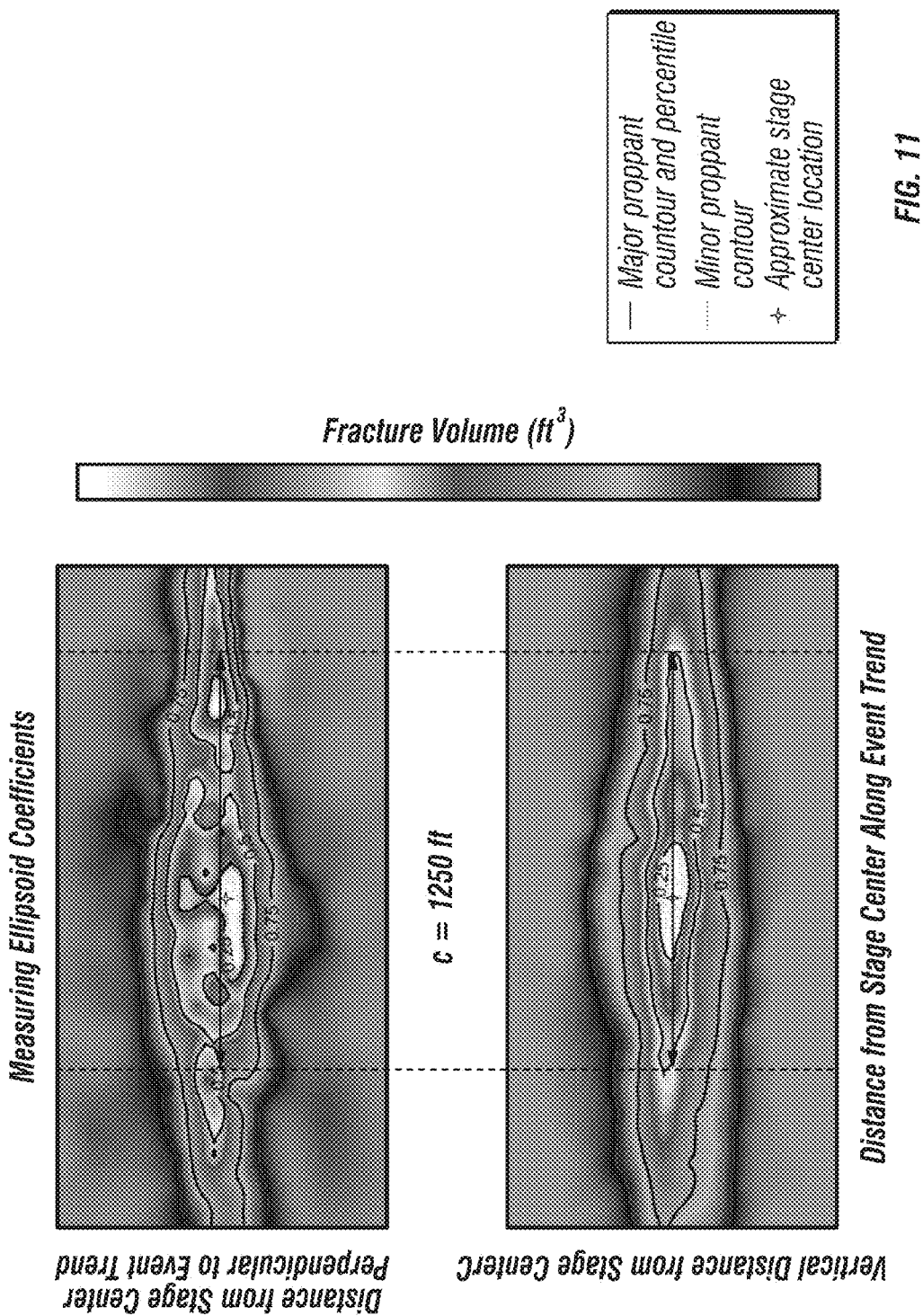
FIGS. 11, 12 and 13 show examples for two different wellbores of using two dimensional equal volume contour plots of the fraction of the total pumped fluid volume to determine the ellipsoidal axes a, b and c.
Figure 12:
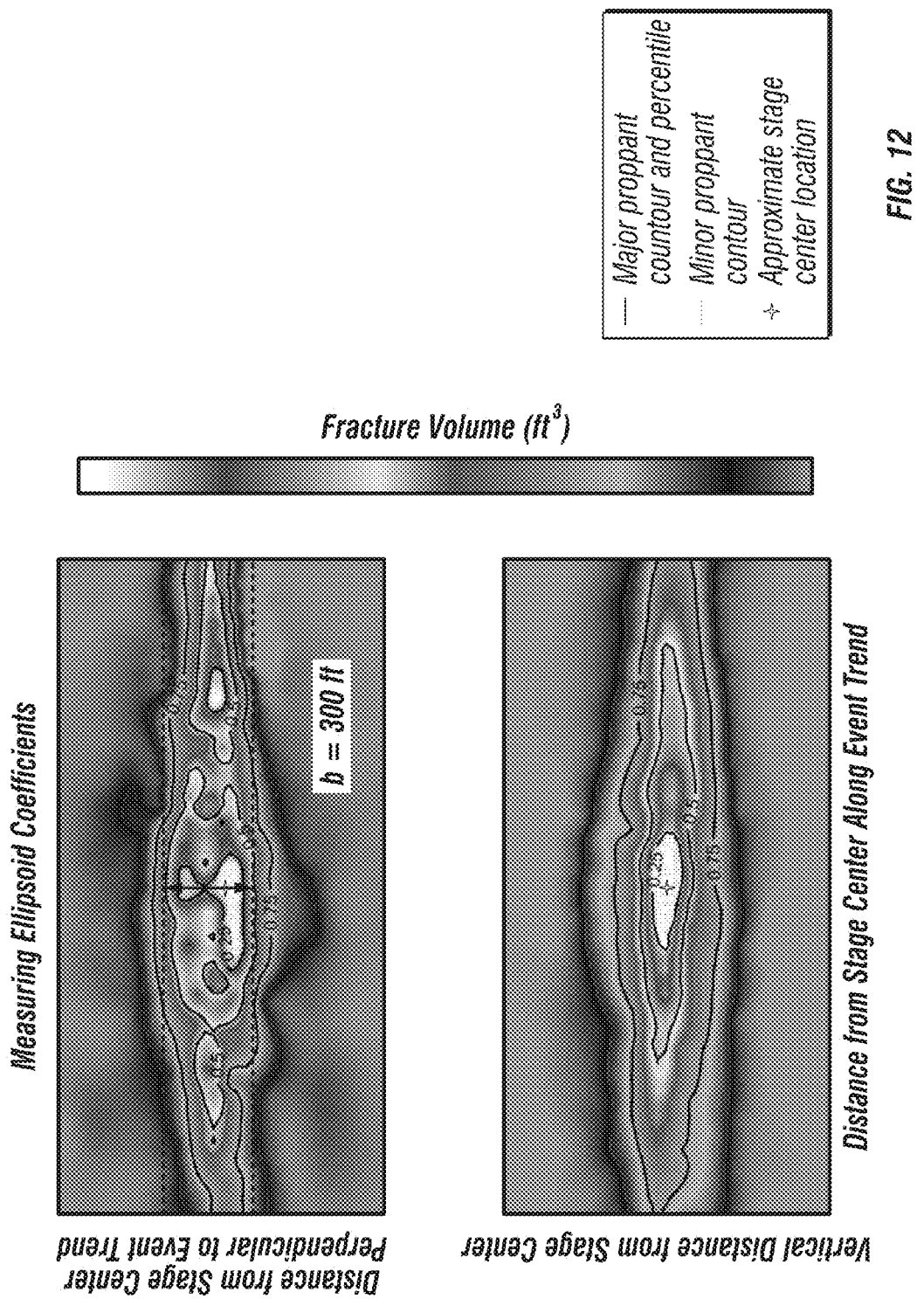
Figure 13:
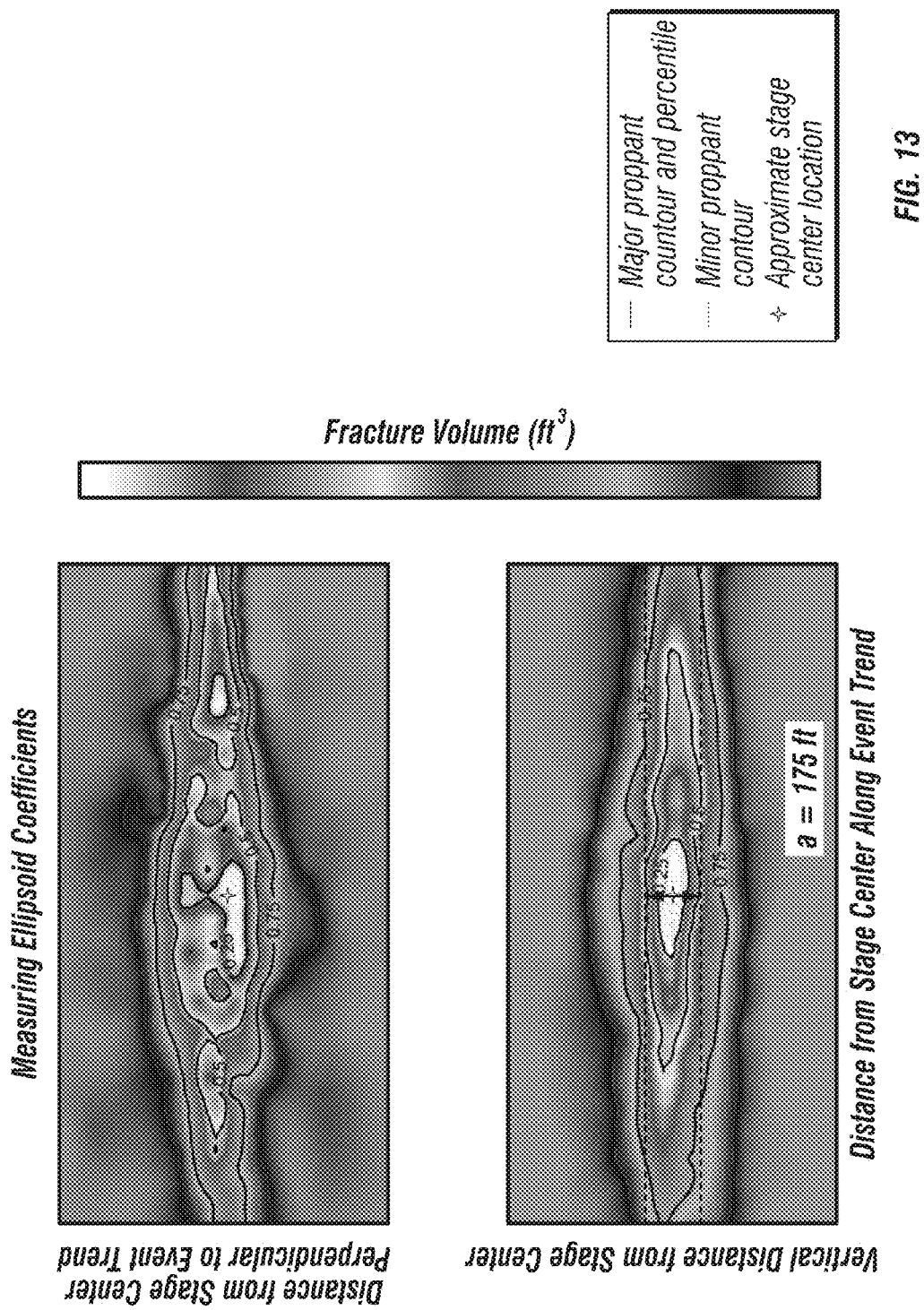

Although the example ellipsoid shown in FIG. 8 is symmetric about the origin (e.g., referenced to a fracture stage center or the wellbore), it should be clearly understood that any ellipsoid axes determined using equal pumped volume surfaces may be asymmetric along any or all axes with respect to the origin FIG. 10 shows a flow chart of a method for using the ellipsoidal representation of the pumped fluid volume to determine spatial distribution of the pumped proppant. At 80, the fractures are modeled from the microseismic event "cloud" (as shown in FIG. 9) so that the total fracture volume is equal to the injected fracture fluid volume minus an empirically determined leakoff volume. At 82, the azimuthal orientation of the ellipsoid, that is, the orientation of the longest axis, c, may be determined as explained above with reference to FIGS. 3 and 4. At 84 and 86, the length of the axes a, b, c of the example ellipsoid shown in FIG. 8 may be determined by determining a distance along each axis from a stage center or the origin of the commonly referenced coordinate system wherein the long axis c may be oriented along the averaged azimuth determined as explained above. Referring briefly to FIGS. 11, 12 and 13, the lengths of the axes c, b and a are shown as being determined by measuring a maximum distance along each axis between points intersecting the 50% total volume contour. In other embodiments, different total volume contours may be used to determine the lengths of the respective ellipsoidal axes. Referring back to FIG. 10, at 88, the proppant injected volume may be calculated from the proppant mass, the proppant specific gravity and the expected proppant porosity in the fractures. At 90, the modeled fractures are filled completely with proppant beginning from the injection or entry point and extending outwardly from injection point in an ellipsoidal fashion using the determined values of a, b, and c until all proppant volume is allocated to the fractures. Thus, a spatial distribution of the proppant may be determined for each type of fracture treatment. In some embodiments, the proppant distribution may be determined for each fracture treatment stage by applying the foregoing method to each treatment stage individually.

FIGS. 11, 12 and 13 show examples for two different wellbores of using two dimensional equal volume contour plots of the fraction of the total pumped fluid volume to determine the ellipsoidal axes a, b and c.

Using the foregoing technique, the effectiveness of any particular type of hydraulic fracture treatment and/or completion equipment used in conjunction with the treatment (e.g., perforate and plug or sliding sleeve valves).

Figure 14:
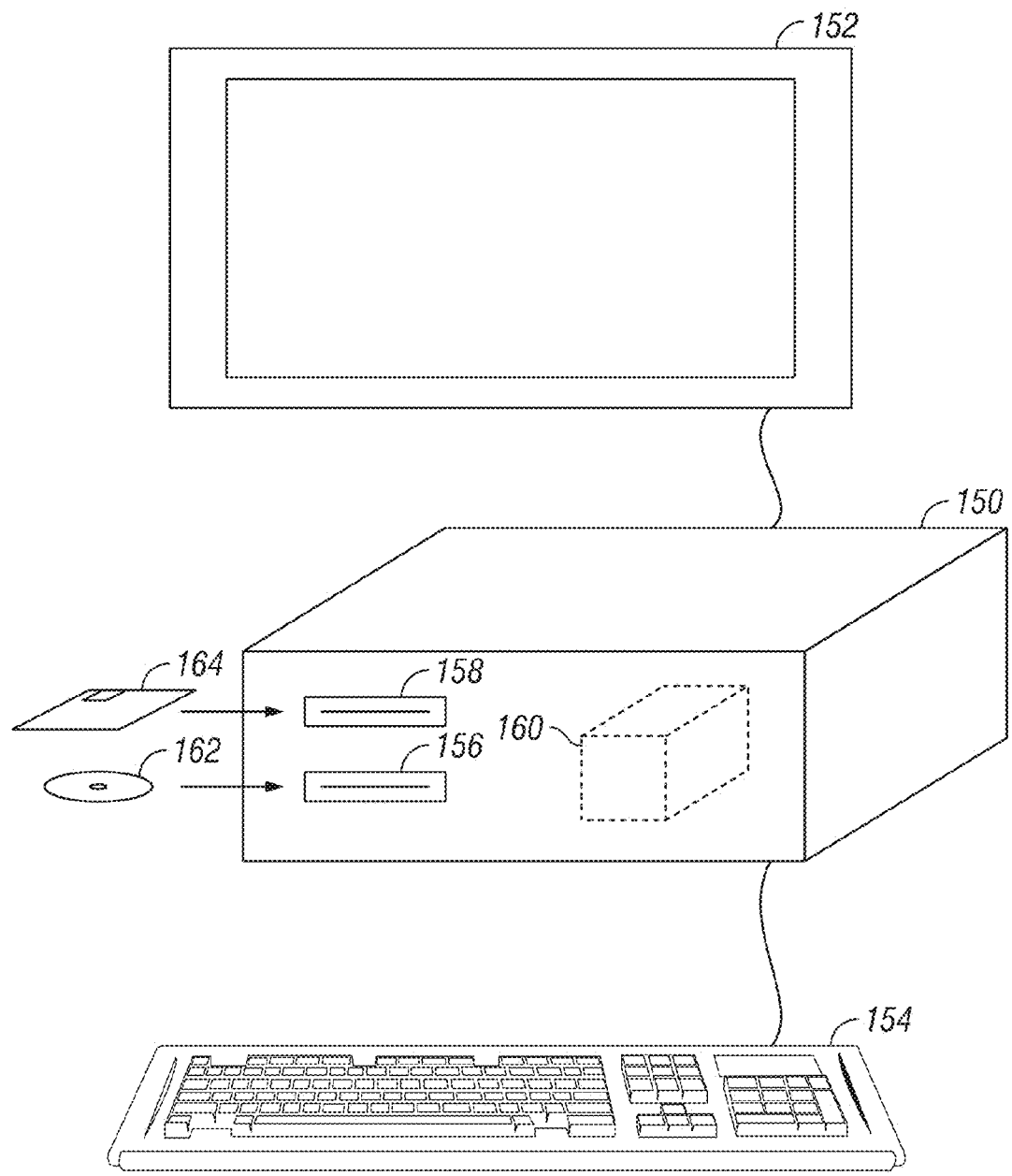
FIG. 14 shows an example computer system that may be used to perform a method according to the present disclosure.

Referring to FIG. 14, the foregoing process as explained with reference to FIGS. 2-13, can be embodied in computer-readable code. The code can be stored on a computer readable medium, such as a solid state memory card or similar plug in device 164, CD-ROM 162 or a magnetic (or other type) hard drive 166 forming part of a general purpose programmable computer. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

The computer, as known in the art, includes a central processing unit 150, a user input device such as a keyboard 154 and a user display 152 such as a flat panel LCD display or cathode ray tube display. According to this aspect of the invention, the computer readable medium includes logic operable to cause the computer to execute acts as set forth above and explained with respect to the previous figures. The computer, as explained above, may be in the recording unit (10 in FIG. 1) or may be any other computer or computer system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to improve recovery of hydrocarbons comprising;
    selecting a first proppant with a first particle size distribution and first particle shape;
    disposing a plurality of seismic sensors in a selected pattern proximate a subsurface formation;
    pumping the first proppant into the subsurface formation to form at least one fracture in the subsurface formation;
    detecting seismic signals from each of the plurality of seismic sensors while pumping the first proppant into the subsurface formation;
    using the detected seismic signals to determine a least one hypocenter of at least one seismic event corresponding to propagation of the at least one fracture in the subsurface formation induced by the first proppant;
    determining a first three dimensional spatial distribution of the first proppant;
    selecting a second proppant with a second particle size distribution and second particle shape;
    pumping the second proppant into the subsurface formation to form at least one additional fracture in the subsurface formation, the second proppant having a second three dimensional spatial distribution larger than the first three dimensional spatial distribution;
    wherein determining the first and second three dimensional spatial distribution comprises;
        communicating as input to a computer the seismic signals detected by the plurality of seismic sensors disposed in the selected pattern proximate the subsurface formation;
        in the computer, determining the at least one hypocenter of each of a plurality of seismic events;
        in the computer, determining a volume and an orientation of at least one fracture in the subsurface formation associated with the at least one hypocenter;

in the computer, estimating a spatial distribution of a volume of the pumped first proppant or the second proppant using the determined volume and orientation of the at least one fracture in the subsurface;

in the computer, selecting a length of ellipsoidal axes using a surface defined by a selected fractional amount of a total volume of the first proppant or second proppant pumped into the subsurface formation; and in the computer, calculating the spatial distribution of the first proppant or the second proppant by spatially distributing a volume of the fractures in the subsurface formation within an ellipsoid defined by the ellipsoidal axes.

2. The method of claim 1 wherein the determining orientation comprises:

in the computer selecting time consecutively occurring ones of the hypocenters falling within at least one selected temporal sampling window, the at least one temporal sampling window including at least one of a selected number of consecutively occurring events and a selected length of time;

in the computer determining a best fit line through the selected hypocenters using a preselected minimum linear regression coefficient;

in the computer repeating the selecting hypocenters and determining best fit lines for additional selected temporal sampling windows; and in the computer, determining spatial orientation of the best fit lines; and in the computer, determining fracture plane orientations from the best fit lines.

3. The method of claim 2 further comprising determining in the computer numbers of best fit lines occurring along selected spatial directions.

4. The method of claim 3 further comprising determining most likely fracture plane orientations using statistical analysis of the best fit lines.

5. The method of claim 1 wherein the determining volume of the at least one fracture associated with each hypocenter comprises:

in the computer determining a facture network using the determined hypocenters and seismic moments determined from the detected seismic signals, the determining a fracture network comprising determining a fracture volume associated with each hypocenter;

in the computer determining a maximum value of a scaling factor based on a subset of the hypocenters having a highest cumulative seismic moment, the scaling factor determined by relating a pumped volume of the fracturing fluid with respect to the determined fracture volumes;

in the computer, scaling dimensions of each fracture using the maximum value of the scaling factor; and recalculating the fracture volumes using the scaled dimensions.

6. The method of claim 5 wherein the maximum value of the scaling factor is selected to exclude values related to tectonic features in the subsurface.

7. The method of claim 5 wherein the scaling factor is selected such that the pumped volume of fracturing fluid multiplied by a fluid efficiency factor substantially equals the total fracture volumes.

8. The method of claim 5 wherein a fracture area of each fracture is determined by a moment determined from detected seismic signal amplitudes.

9. The method of claim 5 wherein the scaling factor is determined by relating a pumped volume of fracture fluid multiplied by a fluid efficiency to the determined fracture volumes.

10. The method of claim 1 wherein the hydraulic fracture fluid is pumped in a plurality of stages separated from each other longitudinally along a wellbore drilled through the subsurface formation and the stages are translated to a common origin.

11. The method of claim 10 wherein a longest one of the ellipsoidal axis is oriented along an average of the orientation of each fracture.

12. The method of claim 1 wherein a longest one of the ellipsoidal axis is oriented along an average of the orientation of each fracture.

13. The method of claim 1 wherein the spatial distribution of the proppant within the ellipsoid is determined using a proppant mass, a proppant specific gravity and an expected proppant porosity within determined fractures.

* * * * *